(12) United States Patent
Braunecker et al.

(10) Patent No.: US 11,791,485 B2
(45) Date of Patent: Oct. 17, 2023

(54) METHOD AND SYSTEM FOR EXAMINING A FUEL CELL BY MEANS OF A CYCLIC VOLTAMMETRIC MEASUREMENT

(71) Applicant: Siemens Energy Global GmbH & Co. KG, Bayern (DE)

(72) Inventors: Michael Braunecker, Nuremberg (DE); Andreas Reiner, Baiersdorf (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/614,033

(22) PCT Filed: Apr. 17, 2020

(86) PCT No.: PCT/EP2020/060844
§ 371 (c)(1),
(2) Date: Nov. 24, 2021

(87) PCT Pub. No.: WO2020/239323
PCT Pub. Date: Dec. 3, 2020

(65) Prior Publication Data
US 2022/0263107 A1 Aug. 18, 2022

(30) Foreign Application Priority Data
May 31, 2019 (EP) .................................... 19177645

(51) Int. Cl.
*H01M 8/0444* (2016.01)
*H01M 8/04082* (2016.01)
(Continued)

(52) U.S. Cl.
CPC ... *H01M 8/04447* (2013.01); *H01M 8/04201* (2013.01); *H01M 8/04529* (2013.01); *H01M 8/04955* (2013.01)

(58) Field of Classification Search
None
See application file for complete search history.

(56) References Cited

U.S. PATENT DOCUMENTS 6,068,942 A 5/2000 Strasser et al.
2010/0112401 A1 5/2010 Noto
(Continued)

FOREIGN PATENT DOCUMENTS

CN 101622748 A 1/2010
CN 114264709 A * 4/2022
(Continued)

OTHER PUBLICATIONS

Machine translation of JP 2013-068567.*
(Continued)

*Primary Examiner* — Amanda C. Walke
(74) *Attorney, Agent, or Firm* — WOLTER VAN DYKE DAVIS, PLLC

(57) ABSTRACT

A method of examining a fuel cell by means of a cyclic voltammetry analysis, wherein the cyclic voltammetry analysis is used to ascertain a gas composition in the fuel cell. The fuel cell has a first gas space for a first reactant and a second gas space for a second reactant, where no reactant is supplied at least to one of the two gas spaces, especially to either gas space, during the cyclic voltammetry analysis. The cyclic voltammetry analysis is used to ascertain a concentration of hydrogen in the gas spaces.

15 Claims, 8 Drawing Sheets

(51) Int. Cl.
  *H01M 8/04492*   (2016.01)
  *H01M 8/04955*   (2016.01)

(56) References Cited

U.S. PATENT DOCUMENTS

| | | |
|---|---|---|
| 2012/0038373 A1 | 2/2012 | Ikeda |
| 2015/0247818 A1 | 9/2015 | Silvester |
| 2019/0157693 A1 | 5/2019 | Schmidt et al. |

FOREIGN PATENT DOCUMENTS

| | | | | |
|---|---|---|---|---|
| DE | 102007002426 A1 | | 11/2007 | |
| EP | 0914685 B1 | | 7/2002 | |
| EP | 3151321 A1 | | 4/2017 | |
| JP | 2000133283 A | | 5/2000 | |
| JP | 2004039490 A | * | 2/2004 | |
| JP | 2008166189 A | | 7/2008 | |
| JP | 2013068567 A | * | 4/2013 | |
| WO | 2010128555 A1 | | 11/2010 | |
| WO | WO-2016073655 A2 | * | 5/2016 | ......... A61B 5/02405 |
| WO | WO-2016188595 A1 | * | 12/2016 | .............. B01J 23/42 |

OTHER PUBLICATIONS

English translation of PCT written opinion.*
PCT International Search Report and Written Opinion of International Searching Authority dated Jul. 28, 2020 corresponding to PCT International Application No. PCT/EP2020/060844 filed Apr. 17, 2020.

* cited by examiner

METHOD AND SYSTEM FOR EXAMINING A FUEL CELL BY MEANS OF A CYCLIC VOLTAMMETRIC MEASUREMENT

CROSS REFERENCE TO RELATED APPLICATIONS

This application is the US National Stage of International Application No. PCT/EP2020/060844 filed 17 Apr. 2020, and claims the benefit thereof. The International Application claims the benefit of European Application No. EP19177645 filed 31 May 2019. All of the applications are incorporated by reference herein in their entirety.

FIELD OF INVENTION

The invention relates to a method and to a system for examining a fuel cell by means of a cyclic voltammetry analysis.

BACKGROUND OF INVENTION

In a fuel cell, the electrochemical combining of hydrogen ($H_2$) and oxygen ($O_2$) at an electrode to give water ($H_2O$) generates electrical current with high efficiency. During the operation of the fuel cells, they are supplied with operating gases—i.e. a hydrogenous fuel gas and an oxygenous oxidation gas. The hydrogen and oxygen are also referred to as "reactants".

A fuel cell typically comprises an ion-permeable electrolyte and, on either side, a catalyst layer and an electrode. In the case of polymer electrolyte membrane fuel cells (PEM fuel cells), the electrolyte is a proton-conducting membrane. This membrane together with the catalyst layer and the electrodes forms a membrane-electrode assembly. This is adjoined on either side by a gas space for the fuel gas and one for the oxidation gas. The electrode in the gas space through which fuel gas flows is typically referred to as "anode", and the gas space as "anode-side gas space". The electrode in the gas space through which oxidation gas flows is typically referred to as cathode, and the gas space as "cathode-side gas space".

There is already a wide variety of known methods of examining fuel cells in the course of regular operation thereof (i.e. in the course of operation in which the gas spaces are supplied with operating gas and the operating gas flows through the gas spaces), in which impedances of the fuel cells are measured in order, for example, to ascertain a supply state of the fuel gas and a moisture state of the electrolyte (see, for example, EP 1 898 483 A1).

It is additionally known that fuel cells can be examined by means of a cyclic voltammetry analysis. A cyclic voltammetry analysis is understood hereinafter to mean an analysis in which an electrode of a fuel cell is subjected cyclically to a defined voltage or potential progression (for example an essentially triangular voltage or potential progression with a preferably constant scan rate or potential rise rate), and a resulting current progression is measured. Cyclic voltammetry analyses are sometimes also referred to as cyclovoltammetry, cyclic voltamperometry or the triangular voltage method.

DE 10 2007 002 426 A1 discloses a diagnosis apparatus in which fuel cells are tested by means of cyclic voltammetry with the system shut down, in order to determine their state of aging. In the known diagnosis apparatus, for analysis of the cathode, nitrogen is passed through the cathode gas space and hydrogen through the anode gas space. For analysis of the anode, the gases are interchanged.

As well as a regular state of operation in which fuel gas and oxidation gas flow through their gas spaces, fuel cells may also have a state of operation in which the gas spaces are not supplied with any gas and therefore these gases do not flow through them either.

For example, this is a storage state or a (temporarily) shut-down or switched-off state. In this state, there is no supply of fuel gas and oxidation gas, nor is any current led off. The gas spaces are isolated on the inlet side from a gas feed or gas supply device (for example by means of a closed valve) or are not connected thereto at all.

In order to prevent corrosion and oxidation in the fuel cell and the components thereof, the gas spaces are frequently filled with hydrogen in such a way that any oxygen penetrating as a result of leaks and lack of tightness is always balanced by a stoichiometric excess of hydrogen. This "excess hydrogen" is generated, for example, at the fuel cell manufacturer in test operation when the fuel cells are switched off (see, for example, EP 0 914 685 B1).

Typically, the electrical load connections of such fuel cells are also short-circuited in order to prevent any potential difference between the cathode and the anode of the fuel cell.

For example, fuel cells, after production thereof and a subsequent test, are frequently not used straight away, but have to be stored in the interim at the manufacturer and/or at a fuel cell purchaser. More particularly, this is applicable to replacement or exchange fuel cells that are held in stock in order to ensure high availability of a fuel cell system in the event of failure of fuel cells and the need for an exchange. Accordingly, these fuel cells are also not connected to supply devices for the reactants.

When the fuel cells are stored, it has to be ensured that there is always an excess of hydrogen in the gas spaces. In addition, it has to be ensured that the electrolyte (the electrolyte membrane in the case of PEM fuel cells) does not dry out.

EP 3 151 321 A1 discloses monitoring a storage state of a fuel cell, the gas spaces of which have been charged with hydrogen during storage, by ascertaining impedances of the fuel cell at at least one first and one second frequency, where the first frequency is greater than the second frequency, and wherein the impedance ascertained at the first frequency is used to monitor a moisture content of the electrolyte and the impedances determined at the two frequencies to monitor a concentration of hydrogen in the gas spaces.

SUMMARY OF INVENTION

Proceeding therefrom, it is an object of the present invention to use cyclic voltammetry analyses in an even more beneficial manner than to date for examination of fuel cells, especially for examination or monitoring of a storage state of a fuel cell.

This object is achieved by a method 1 and a system according to the independent claims. Inventive uses of the method are the subject claimed herein. A fuel cell apparatus of the invention is the subject claimed herein. An evaluation system and an analysis system are the subject claimed herein. Advantageous configurations are the subject of the respective dependent claims.

The invention is based on the surprising finding that it is also possible by means of a cyclic voltammetry analysis to ascertain a gas composition, especially an excess of hydrogen, in the fuel cell or in its gas spaces (i.e. both in the anode-side and in the cathode-side gas space thereof) and hence to distinguish between different gas compositions. As recognized and shown experimentally by the inventors, it is possible, for example, to distinguish between a gas atmosphere with excess hydrogen and a gas atmosphere with excess oxygen. The invention can thus be utilized particularly advantageously for monitoring of a state of a stored or nonoperational fuel cell, especially also from afar, for example by means of a remote computer network (cloud). But it may also be utilized very advantageously for monitoring and/or control of a shutdown operation of a fuel cell, especially in order to establish a desired gas atmosphere in the fuel cell, for example an excess of hydrogen. This is possible without interventions in the fuel cell and with just a single analysis instrument. All that is needed is access to load terminals of the fuel cell.

In the method of the invention, therefore, a cyclic voltammetry analysis is used to ascertain a gas composition, especially an excess of hydrogen, in the fuel cell.

In an advantageous configuration of the method, the fuel cell has a first gas space for a first reactant and a second gas space for a second reactant, where no reactant is supplied at least to one of the two gas spaces, especially to either gas space, during the cyclic voltammetry analysis. For example, in the case of a stored or nonoperational fuel cell, no reactant is supplied to either gas space. In the case of shutdown of the fuel cell, it is also possible that no reactant is supplied to just one of the two gas spaces for a period of time. In that case, the gas space(s) without reactant supply is/are isolated, for example, from a connected gas feed or gas supply device (for example by means of a closed valve) or not connected thereto at all.

As has also been found, it is even possible to ascertain a hydrogen concentration in the gas spaces from the cyclic voltammetry analysis and hence to distinguish between different hydrogen concentrations in the gas spaces.

In a further advantageous configuration, a piece of information, especially an optical signal, is generated when a criterion (e.g. attainment, exceedance, undershooting) in relation to a threshold value is satisfied for at least one measurement in the cyclic voltammetry analysis and/or at least one value derived therefrom. More particularly, this may be a threshold value that represents a minimum permissible concentration of hydrogen in the gas spaces.

It is possible here in a particularly simple manner to monitor the maximum and minimum current value measured within a cycle of the cyclic voltammetry analysis and/or an absolute difference between these two current values that is derived therefrom. As has been found, it is possible to use this difference to ascertain an amount of hydrogen or a concentration of hydrogen. For monitoring of the hydrogen concentration, therefore, it is particularly simple to define a threshold value for a minimum permissible absolute difference between these two current values.

As has been found, a particularly high measurement accuracy is achievable when a scan rate (also referred to as potential rise rate) for the cyclic voltammetry analysis is less than 0.7 mV/s. An optimum between measurement accuracy and duration of measurement is achievable when the scan rate is between 0.15 mV/s and 0.5 mV/s, especially 0.33 mV/s. If multiple fuel cells of a fuel cell stack are being examined, the scan rate for the cyclic voltammetry analysis is preferably in linear proportionality with the number of fuel cells. The scan rate in that case is preferably less than $0.7*Z$ mV/s where Z is the number of fuel cells. An optimum between measurement accuracy and duration of measurement is achievable when the scan rate is between $0.15*Z$ mV/s and $0.5*Z$ mV/s, especially $0.33*Z$ mV/s.

It has additionally been found that, for a high measurement accuracy of the cyclic voltammetry analysis, it is advantageous to take account of the moisture content of the electrolyte in the selection of parameters in the cyclic voltammetry analysis. This is based on the finding that the impedance of a fuel cell rises with falling moisture content of the electrolyte. In order to compensate for this, in an advantageous configuration, therefore, a moisture content of an electrolyte in the fuel cell is ascertained, preferably by means of impedance spectroscopy, and a parameter of the cyclic voltammetry analysis (especially a scan rate, a minimum potential and/or a maximum potential) is adjusted depending on the moisture content ascertained. For example, with falling moisture content and hence rising impedance, it is possible to increase the scan rate and/or the minimum and maximum potential.

Also within the scope of the invention is a method of examining a fuel cell, comprising the following steps:— receiving measurements from a cyclic voltammetry analysis on a fuel cell and/or values derived therefrom, —ascertaining a gas composition, especially an excess of hydrogen, in the fuel cell depending on the values received.

Also within the scope of the invention is a method of examining a fuel cell, comprising the following steps:— generating measurements from a cyclic voltammetry analysis on a fuel cell, —transmitting the measurements and/or values derived therefrom to an evaluation device that is spatially separated from the fuel cell and is preferably cloud-based, for ascertainment of a gas composition, especially of an excess of hydrogen, in the fuel cell depending on the values transmitted.

A system of the invention for examining a fuel cell comprises an analysis device for a cyclic voltammetry analysis on the fuel cell and an evaluation device designed to ascertain a gas composition, especially an excess of hydrogen, in the fuel cell depending on the cyclic voltammetry analysis.

The evaluation device here may also be designed to ascertain a concentration of hydrogen in the fuel cell.

The evaluation device is preferably designed to generate a piece of information, especially an optical signal, when a criterion in relation to a threshold value is satisfied for at least one measurement in the cyclic voltammetry analysis and/or at least one value derived therefrom, especially a threshold value representing a minimum permissible concentration of hydrogen in the gas spaces. For this purpose, for example, it is possible to store a threshold value for a minimum permissible absolute difference between a minimum current value and a maximum current value measured within one cycle in the evaluation device.

In an advantageous configuration, a scan rate for the cyclic voltammetry analysis is less than 2 mV/s, preferably 1 mV/s.

The system of the invention preferably comprises a device for ascertaining a moisture content of an electrolyte in the fuel cell, preferably by means of impedance spectroscopy, wherein the analysis device is designed to adjust a parameter from the cyclic voltammetry analysis (especially a scan rate, a minimum potential and/or a maximum potential), depending on the moisture content ascertained.

A fuel cell apparatus of the invention comprises at least one fuel cell and an above-described system for analyzing the fuel cell.

Advantageously, the fuel cell has a first gas space for a first reactant and a second gas space for a second reactant, wherein at least one of the gas spaces, preferably both gas spaces, is/are closable at the inlet side for the cyclic voltammetry analysis.

An evaluation system of the invention for examining a fuel cell comprises a receiving device designed to receive measurements from a cyclic voltammetry analysis on a fuel cell and/or values derived therefrom, and an evaluation device designed to ascertain a gas composition, especially an excess of hydrogen, in the fuel cell depending on the values received.

An analysis system of the invention for examining a fuel cell comprises an analysis device for a cyclic voltammetry analysis on the fuel cell and a transmission device designed to transmit measurements from the cyclic voltammetry analysis and/or values derived therefrom to an evaluation device that is spatially separated from the analysis device and is preferably cloud-based, for ascertainment of a gas composition, especially an excess of hydrogen, in the fuel cell depending on the values transmitted.

The effects and advantages mentioned for the method of the invention and its advantageous configurations are correspondingly applicable to the systems of the invention and their advantageous configurations.

BRIEF DESCRIPTION OF THE DRAWINGS

The invention and further advantageous configurations of the invention according to features of the dependent claims are elucidated in detail hereinafter in the figures with reference to working examples. In these figures, corresponding parts are each given the same reference numerals. The figures show:

DETAILED DESCRIPTION OF INVENTION

Figure 1:
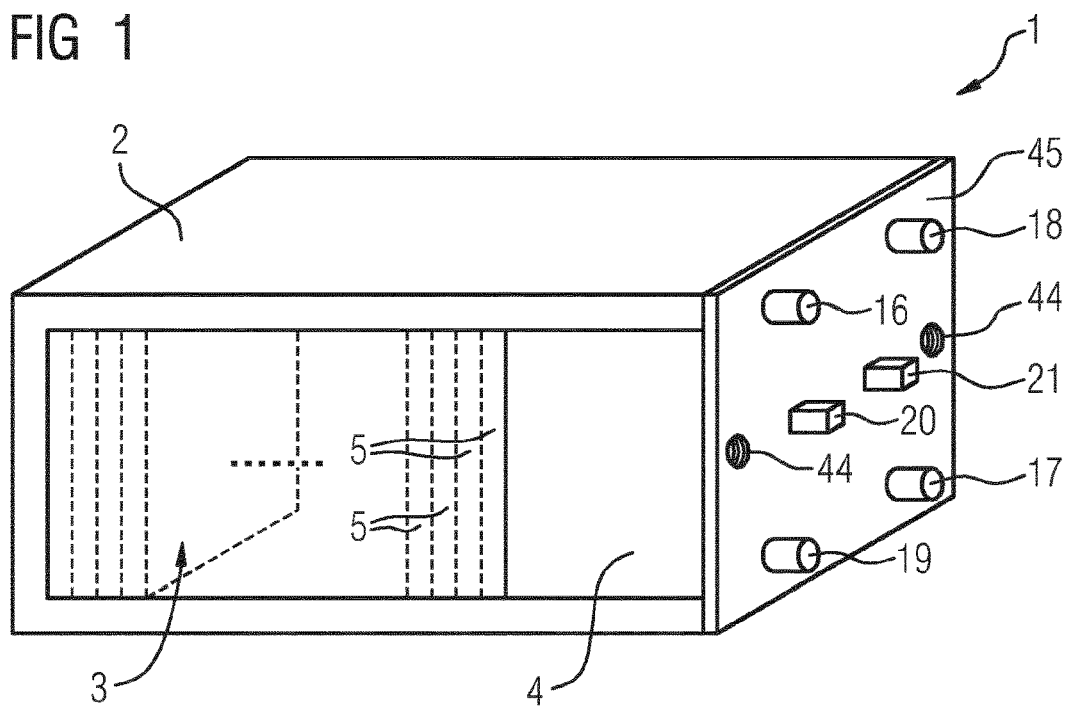
FIG. 1 a fuel cell module known from the prior art with a fuel cell stack in a simplified illustration, FIG. 2 a basic structure of a PEM fuel cell, FIG. 3 a basic structure of a system of the invention for monitoring a storage state of a fuel cell or a fuel cell stack, FIG. 4 an example of an external view of a monitoring system according to FIG. 3, FIG. 5 an illustrative attachment of the monitoring system according to FIG. 3 to the fuel cell module of FIG. 1, FIG. 6 voltammograms of gas atmospheres in fuel cells with excess oxygen and excess hydrogen, FIG. 7 voltammograms for different concentrations of hydrogen or contents of hydrogen in nitrogen in the fuel cells, FIG. 8 a graph of the correlation between amount of charge measured and scan rate of the cyclic voltammetry analysis, FIG. 9 progressions of current against time in cyclic voltammetry analyses for different hydrogen concentrations, FIG. 10 a graph comparison of calculated amounts of hydrogen and concentrations of hydrogen established, FIG. 11 a monitoring system with a cloud-based evaluation device, FIG. 12 the monitoring system of FIG. 11 with monitoring of multiple fuel cell modules.

FIG. 1 shows a simplified diagram of a fuel cell module 1 which—surrounded by a housing 2—comprises a fuel cell stack 3 and an operative part 4.

The fuel cell stack 3 in turn consists of multiple stacked and hence electrically series-connected single fuel cells 5, PEM fuel cells here.

Figure 2:
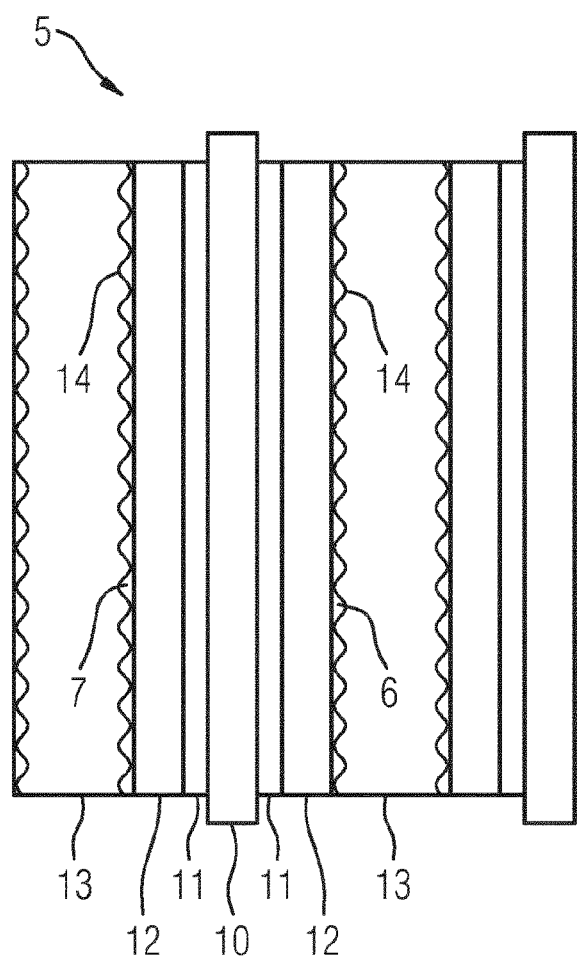

Each of the fuel cells has—as shown in simplified form in a section in FIG. 2—a membrane 10 and, on each side thereof, a catalyst layer 11 and an electrode 12 or gas diffusion layer. This is adjoined by a bipolar plate 13 that establishes the electrical connection to the next fuel cell 5 and in which gas distributor structures 14 have been inserted, which form gas spaces 6, 7 for the hydrogen and oxygen reactants. The electrode 12 adjoining a gas space 6 for hydrogen is also called anode, and the electrode 12 adjoining a gas space 7 for oxygen is also called cathode. Channels for supply and removal of the reactants to and from the fuel cells, seals, etc. are not shown for simplification of the drawing.

The operative part 4 comprises terminal technology, sensors, valves, water separators, etc. of the fuel cell module 1.

At the operative part end of the fuel cell module 1 there are terminals 16, 17 for the supply and removal of hydrogen, and terminals 18, 19 for the supply and removal of oxygen (see FIG. 1).

In addition, electrical load terminals 20, 21 are guided to the outside at the operative part end of the fuel cell module 1, and these can be connected to an electrical load (not shown) to be fed with current from the fuel cell module 1.

In addition, at the operative part end of the fuel cell module 1, there may also be a terminal for tapping of a signal from a pressure sensor that measures the pressure in the gas spaces 6, 7 of the fuel cells 5 and/or a terminal for tapping of a signal from a temperature sensor that measures a temperature of the fuel cell stack 3.

The fuel cell module 1 is a nonoperational module being stored in a storage facility for fuel cell modules. The terminals 16, 17, 18, 19 are therefore isolated from corresponding supply and removal systems for hydrogen and oxygen. For example, the terminals are sealed gas-tight with screwed-on lids. In addition, the load terminals 20, 21 are not connected to a load. The gas spaces 6, 7 are charged with hydrogen for avoidance of corrosion and oxidation.

Figure 3:
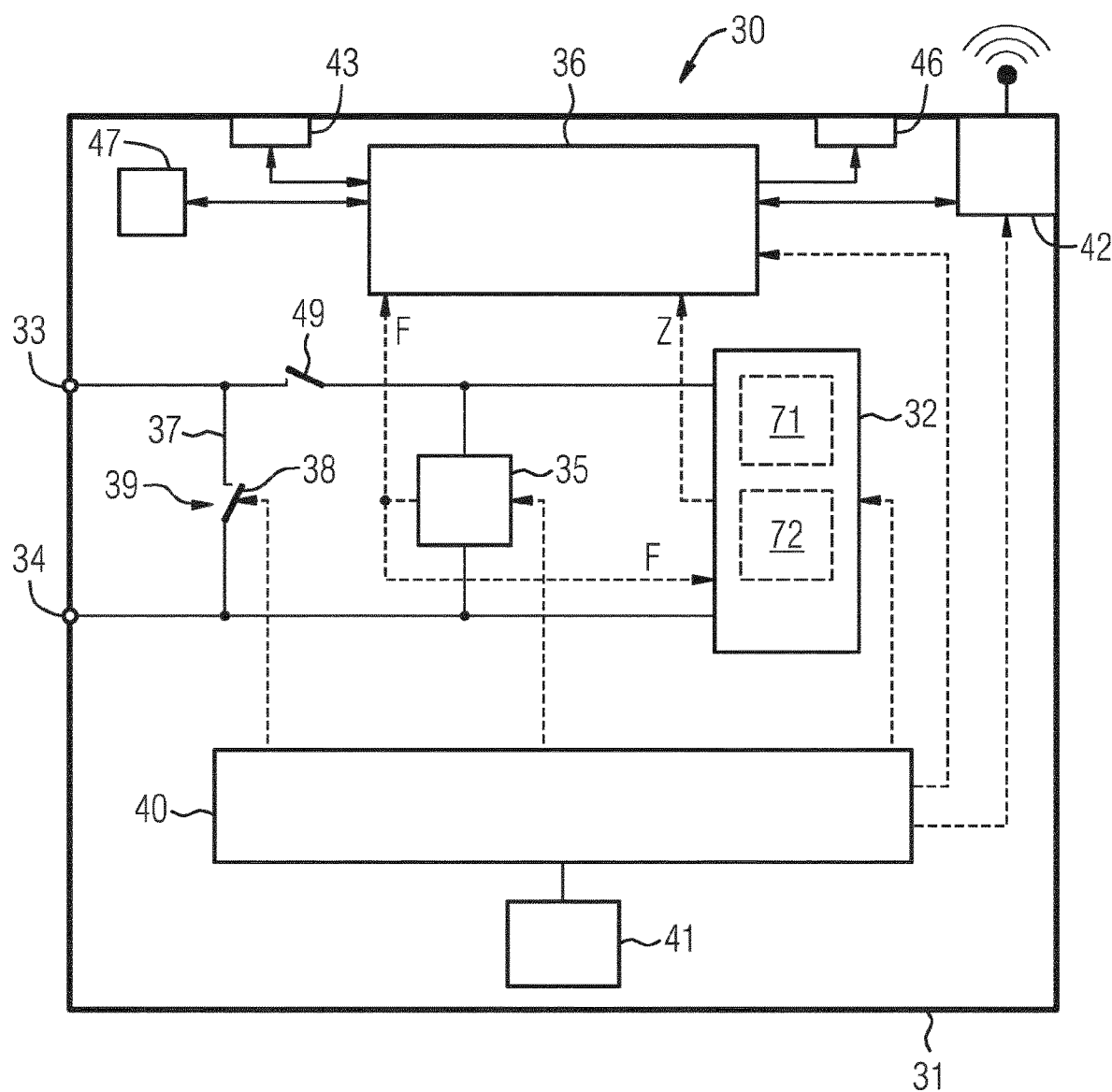

FIG. 3 shows, in a basic diagram, a system 30 of the invention for examining the fuel cell module 1, especially for monitoring the storage state of the fuel cell module 1.

The system 30 comprises—surrounded by a housing 31—an analysis device 32 for a cyclic voltammetry analysis on the fuel cell stack 3 of the fuel cell module 1. For this purpose, the analysis device 32 is electrically connectable via contacts 33, 34 to the electrical load terminals 20, 21 of the fuel cell stack 3. The analysis device 32 generates an analysis voltage at the contacts 33, 34 or the electrical load terminals 20, 21 and measures a current generated as a result through the fuel cell stack 3. For this purpose, the analysis device 32 comprises a merely indicated voltage source 71 for generation of a cyclic voltammetry analysis voltage (meaning a cyclical sweep through a defined potential range) and a device 72 for measurement of the current that flows from the contact 33 through the analysis device 32 and the contact 34.

The system 30 further comprises an evaluation device 36 designed to ascertain a gas composition, especially an excess of hydrogen, in the fuel cell stack 3 depending on the cyclic voltammetry analysis.

In addition, the system 30 comprises a device 35 for ascertaining a moisture content of the electrolyte of the fuel cells by means of impedance spectroscopy. Such a device is described, for example, in EP 3 151 321 A1.

Measurements Z by the cyclic voltammetry analysis are transmitted to the evaluation device 36, and measurements F from the measurement of moisture content are transmitted both to the evaluation device 36 and to the analysis device 32. The analysis device 32 is designed to adjust a scan rate of the voltage in the cyclic voltammetry analysis depending on the measurements F from the measurement of moisture content.

By means of an electrical branch 37 with a switch 38, a short-circuiting device 39 is implemented, and hence an electrical short-circuit can be made to the contacts 33, 34 and hence to the load terminals 20, 21, or they can be isolated from one another. By means of a switch 49 connected between the electrical branch 37 and the current analysis device 35, the analysis voltage of the analysis device 32 or an analysis current of the device 35 can be connected to the contacts 33, 34 or load terminals 20, 21, or isolated therefrom.

A control device 40 controls the individual components 32, 35, 36, 38, 49, and especially supplies them with electrical energy from an energy storage means 41 (for example a battery). The energy storage means 41 enables a grid-independent, isolated power supply for the system 30 for a particular period of time, for example one year.

The control device 40 controls the short-circuiting device 39 in such a way that the contacts 33, 34 or load terminals 20, 21 are short-circuited when no analysis is in progress. Advantageously, for saving of energy, the actuation is effected in such a way that the load terminals 20, 21 are short-circuited without voltage excitation by the control device 40 and are not short-circuited with voltage excitation by the control device 40.

The control device 40 discontinuously triggers, preferably at periodic time intervals, in succession, first a measurement of moisture content by the device 35 and then a cyclic voltammetry analysis by the analysis device 32. It is the analysis device 32 that sets the scan rate for the voltage in the cyclic voltammetry analysis depending on the previously obtained measurements F from the measurement of moisture content.

For the duration of such an analysis, the control device 40 opens the switch 38 and closes the switch 49. On conclusion of the analysis, the control device 40 closes the switch 38 again and opens the switch 49.

The system 30 optionally comprises a transmission device 42, coupled to the evaluation device 36, for wireless communication with a supervisory monitoring device and a transmission device 43 for wired communication with a supervisory monitoring device.

Figure 4:
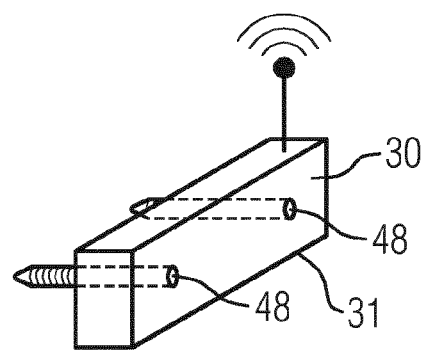
Figure 5:
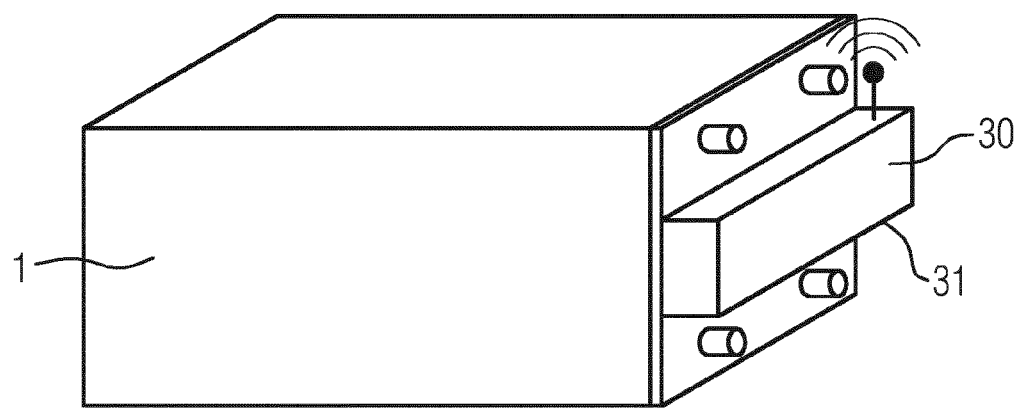

The housing 31 of the system 30 also has interfaces for detachable mechanical connection, especially for detachable screw mounting or plug connection, of the system 30 to the operative part end of the fuel cell module 1 and for formation of electrical contact of the terminal contacts 33, 34 with the electrical load terminals 20, 21 of the fuel cell module 1. In addition, it is also possible for there to be interfaces for a connection of a pressure sensor that measures the pressure in the gas spaces 6, 7 of the fuel cells 5 and/or a connection of a temperature sensor that measures a temperature of the fuel cell stack 3. Conversely, the fuel cell module 1 also has an interface for accommodation of the system 30. There are innumerable possible ways of executing the interfaces, for example in the form of plug connections or screw connections. By way of example, according to FIG. 4, the housing 31 can be screwed via multiple screws 48 into threaded holes 44 worked into an end plate 45 of the module 1 (see FIG. 1). FIG. 5 shows, by way of example, the system 30 mounted on the fuel cell module 1.

FIGS. 6 to 10 elucidate, by way of example, the invention and use thereof in an examination and monitoring method implemented by the system 30. By way of example, the starting point is a fuel cell stack 3 consisting of three fuel cells 5. Prior to commencement of the measurements described hereinafter, the fuel cells 5 were switched off, i.e. the drawing of current and the supply of reactants were stopped. The gas spaces were purged with a moistened gas for 5 minutes. Subsequently, the gas spaces of the fuel cells connected in series on the supply and removal sides were shut off on the input side, i.e. at the input of the fuel cell arranged first in flow direction, and on the output side, i.e. at the output of the fuel cell arranged last in flow direction. In other words, no reactant gas was fed in or out during the analysis. The cyclic voltammetry analysis is effected by means of the load terminals via the external pole plates of the fuel cell stack.

After a few hours, a temperature, concentration and pressure equilibrium is established between the two gas spaces 6, 7 of the fuel cells 5. In the case of an excess of hydrogen in all gas spaces 6, 7 of the fuel cells 3, there should then no longer be any oxygen present in the gas spaces 6, 7, since the reactions in that case must have ended by then if all oxygen has been consumed. The converse situation applies in the case of an oxygen excess.

The cyclic voltammetry analysis was undertaken with the following settings:

Number of cycles: 2
Start and end potential: 0 V
Hold time: 1 s
Min. and max. potential: −10 mV to +10 mV
Scan rate: 3 * 0.33 mV/s ≈ 1 mV/s
Temperature: about 25° C.

Figure 6:
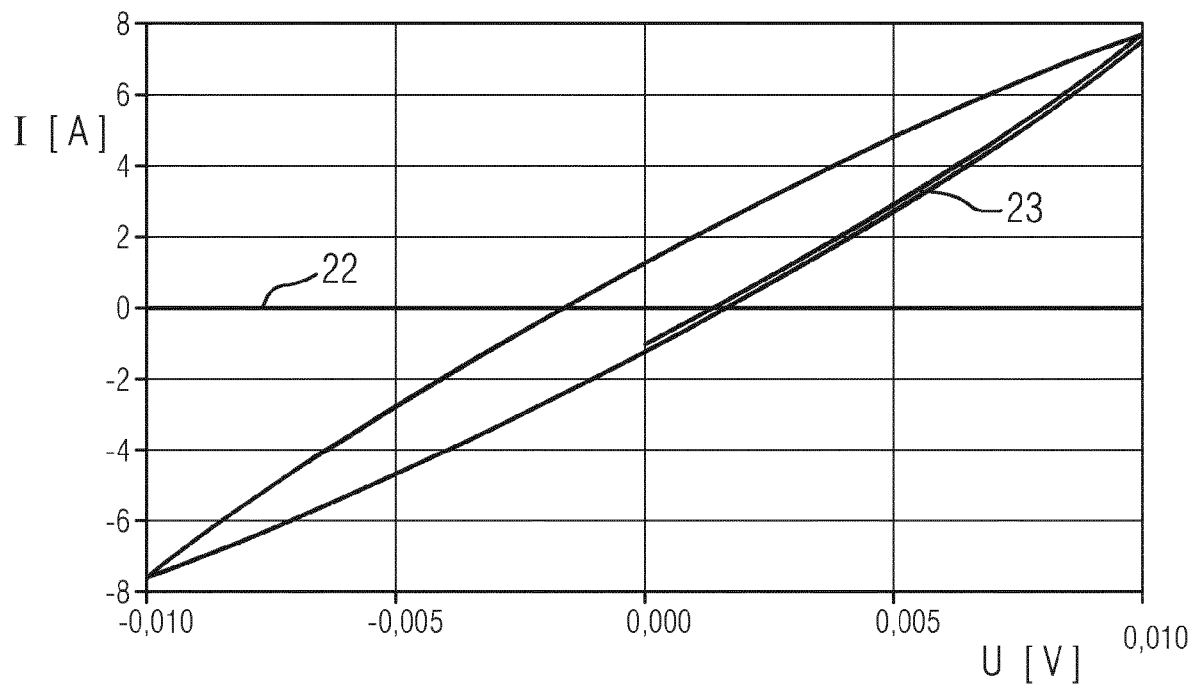

FIG. 6 shows, for a cyclic voltammetry analysis, a measured current I against a set potential U. 22 here denotes a measurement curve in the form of a voltammogram for an atmosphere with excess oxygen in all gas spaces 6, 7 of the fuel cells 3, and 23 a voltammogram for excess hydrogen in all gas spaces 6, 7 of the fuel cells 3. As apparent from FIG. 6, the voltammograms of excess oxygen and excess hydrogen atmosphere look very different. With the aid of a cyclic voltammetry analysis, it is thus possible to ascertain a gas composition in a fuel cell or to distinguish between different gas compositions (here between an excess of hydrogen and an excess of oxygen). If a fuel cell is filled predominantly with nitrogen in both gas spaces, the result is a similar voltammogram to the voltammogram 22 for excess oxygen. However, the case that essentially only nitrogen is present after a shutdown is very improbable since the exactly corresponding stoichiometric amounts of hydrogen and oxygen must have been present in that case in the fuel cell.

Figure 7:
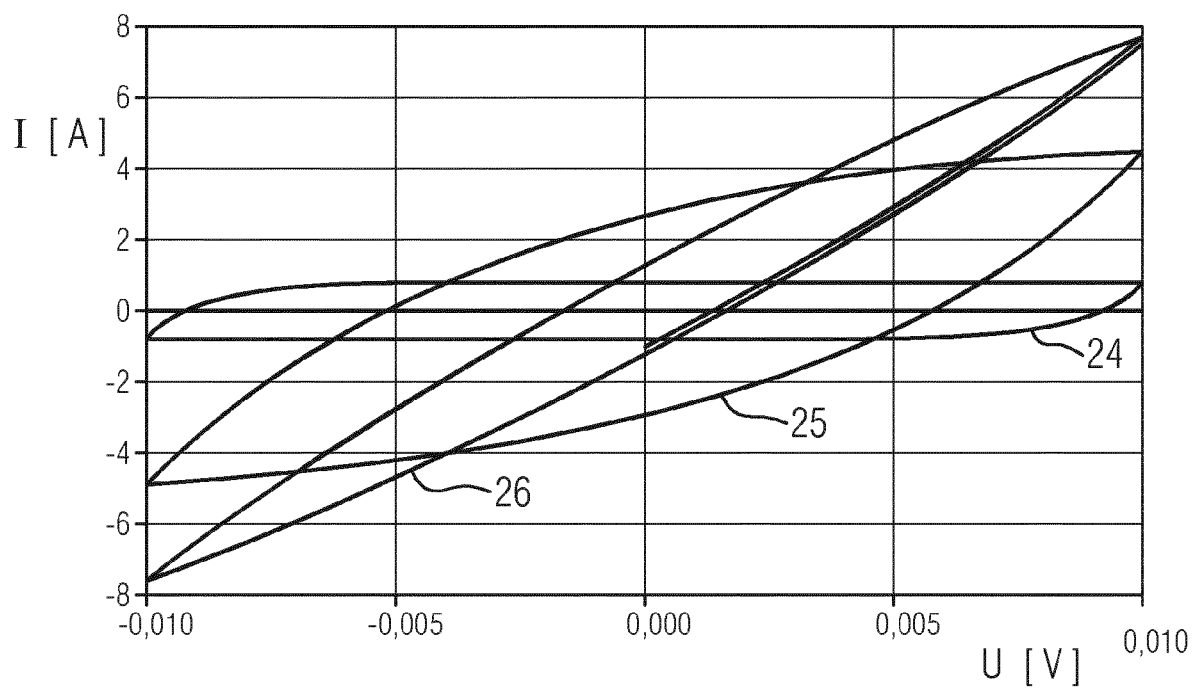

FIG. 7 shows voltammograms for different hydrogen concentrations or contents of hydrogen in nitrogen in the fuel cells 3. 24 here denotes a voltammogram for a low hydrogen content compared to nitrogen, 25 a voltammogram for a high hydrogen content compared to nitrogen, and 26 a voltammogram for the case that no nitrogen is present in the gas spaces 6. As is apparent, the voltammograms become ever flatter with falling hydrogen content and approach lower currents. With the aid of a cyclic voltammetry analysis, it is thus possible to distinguish between different hydrogen concentrations or contents.

Figure 8:
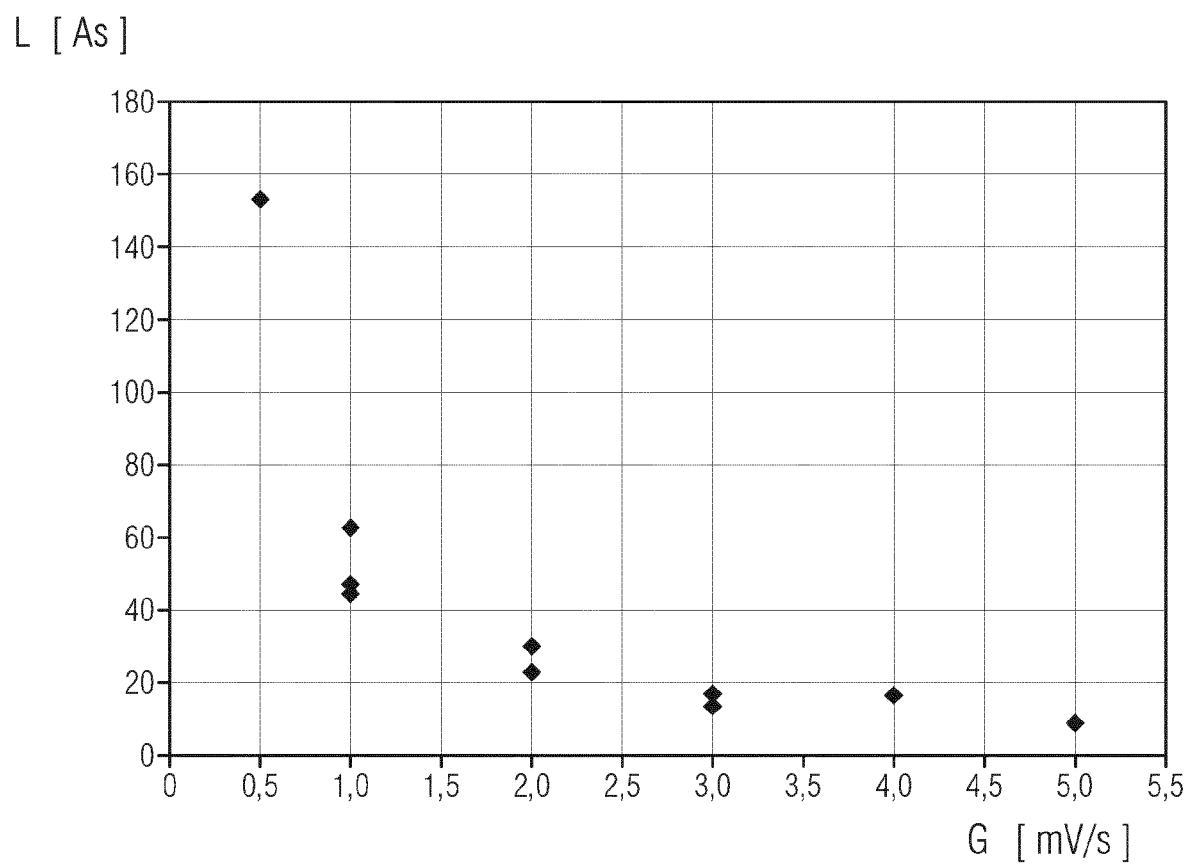

In order to establish what influence the scan rate has on the results of the cyclic voltammetry analysis, experiments were conducted with different scan rates. FIG. 8 shows the amount of charge L against the scan rate G for multiple measurement points. Hydrogen transport clearly rises as the scan rate G falls. The basis of this effect is that the lower the scan rate G, the more time there is for the adsorption of hydrogen on the catalyst. More sites on the catalyst are occupied, and more hydrogen is converted. In turn, analysis accuracy falls at higher scan rates G on account of the smaller amount of charge transferred. In the region of about 1 mV/s (corresponding to about Z*0.33 mV/s, where Z=3 here for 3 fuel cells), there is an optimum between analysis accuracy and duration of the analyses.

Figure 9:
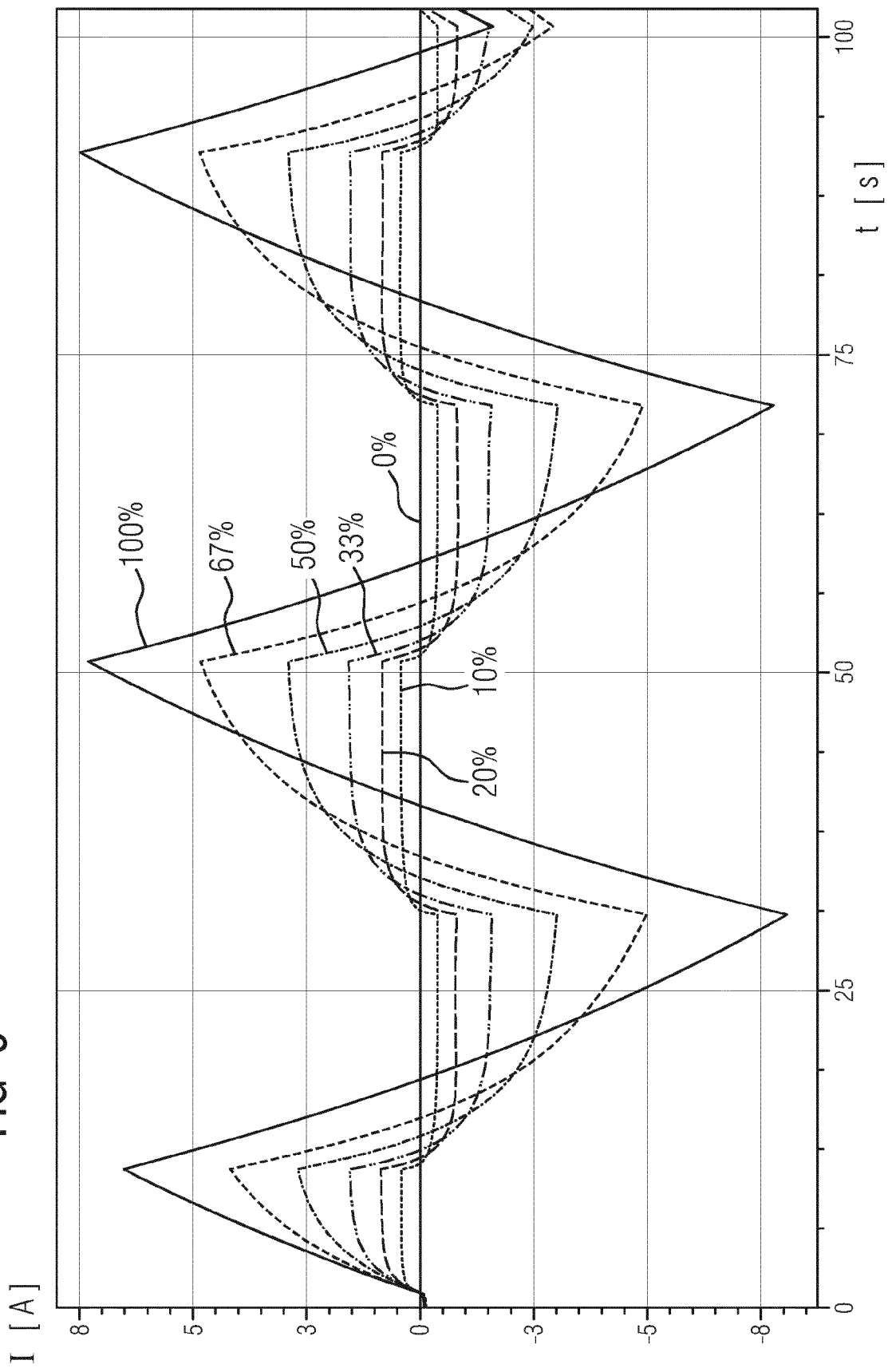

FIG. 9 shows the current I for one cycle of a voltammogram against time t for different concentrations of hydrogen in a hydrogen/nitrogen mixture in the gas spaces 6, 7 of the fuel cells 3. For the different analyses, the same pressure level in each case was established at the inlet of the fuel cells.

The corresponding amount of hydrogen $n_{H2}$ can then be calculated as follows from the minimum current value $I_{min}$ and the maximum current value $I_{max}$:

$$nH_2 = \frac{|I\min - I\max|}{zF} * t$$

Q amount of charge
t time for one cycle, here: 20 sec.
z number of electrons transferred in the reaction, here: 2
F Faraday constant $$nH_2 = \left[\frac{A*s}{\frac{c}{mol}} = \frac{c}{\frac{c}{mol}} = mol\right]$$

The results are listed in table 1:

TABLE 1

Evaluation against the differences

| Amount of H2 in % | Absolute difference | Amount of hydrogen in mol (q = 1/zF) * 20 s |
|---|---|---|
| 0 | 0.0765 | 7.92E–06 |
| 1 | 0.110 | 1.14E–05 |
| 2 | 0.130 | 1.35E–05 |
| 5 | 0.400 | 4.15E–05 |
| 5 | 0.400 | 4.15E–05 |
| 10 | 0.877 | 9.09E–05 |
| 10 | 0.872 | 9.04E–05 |
| 20 | 1.67 | 1.73E–04 |
| 33 | 3.30 | 3.42E–04 |
| 50 | 6.04 | 6.26E–04 |
| 67 | 9.81 | 1.02E–03 |
| 100 | 15.3 | 1.59E–03 |

Figure 10:
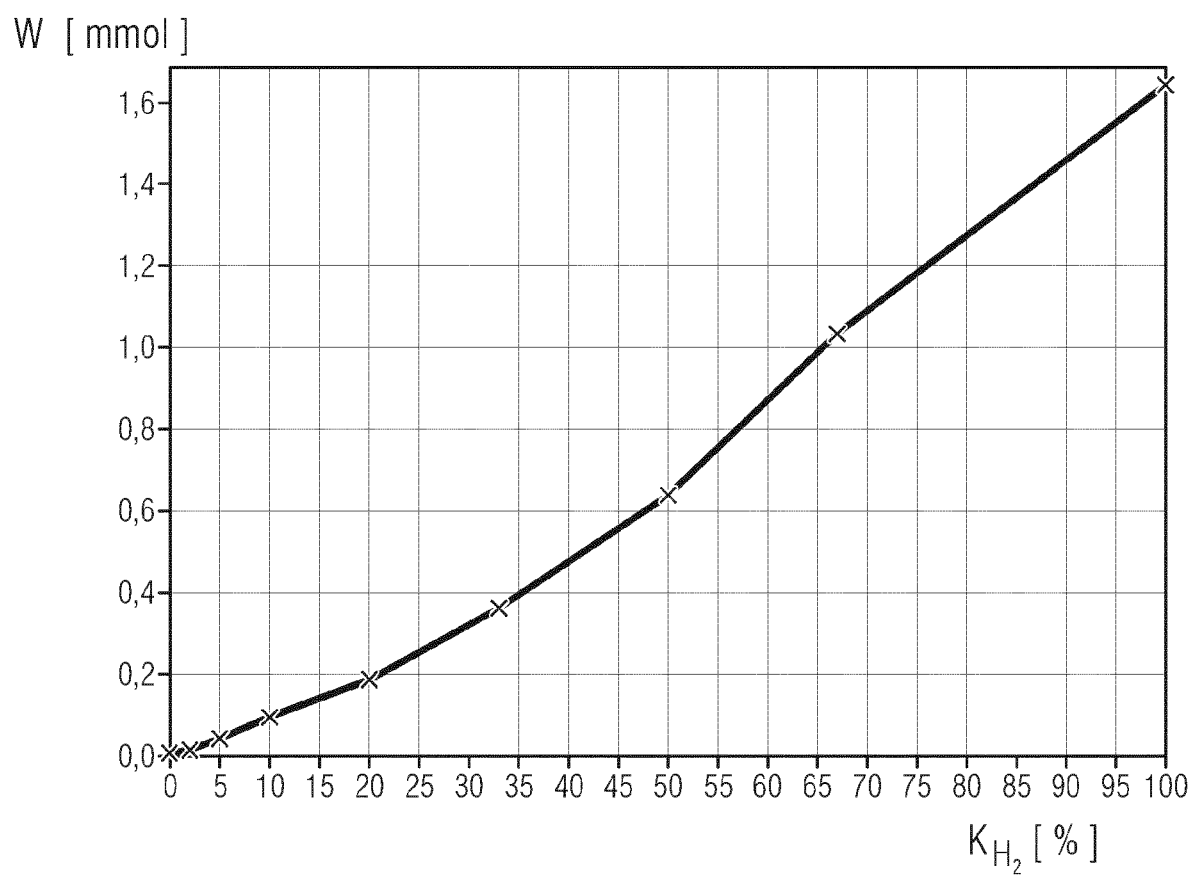

The results are also shown in graph form in FIG. 10. This shows the calculated amount of hydrogen W against the respective concentration of hydrogen established $K_{H2}$. An almost linear correlation is apparent between the absolute differences (i.e. difference between minimum current value $I_{min}$ and maximum current value $I_{max}$) or from the amounts of hydrogen calculated therefrom and the hydrogen concentration established. The differences between the minimum and maximum current values during a cycle of the cyclic voltammetry analysis can thus be used in a particularly simple and rapid manner to ascertain an amount of hydrogen, and a concentration of hydrogen therefrom.

Alternatively, the calculation of the amount of hydrogen W can also be effected, for example, via the ideal gas law taking account of the initial pressures and final pressures in the gas spaces 6, 7 during a voltammetry cycle or by deriving the amount of hydrogen converted from a determination of the amount of charge by integrating the current over time.

Fundamentally, in a comparison of different voltammograms, it must be ensured that the pressures are the same in order to assure comparability. At a comparatively higher pressure, there are more hydrogen molecules in the system that can be pumped through the membrane. A higher pressure means a higher concentration of hydrogen. As a result, a greater amount of charge is measured. The influence of temperature is very small compared to the pressure. The amount of charge becomes only slightly greater at elevated temperature. This may be because of a comparatively accelerated reaction rate. It is therefore possible to compare voltammograms at different temperatures.

In order to increase the accuracy of the analyses, therefore, preference is given to measuring the pressure in the gas spaces of the fuel cells and correcting the measurements to a constant pressure. Advantageously, the temperature of the fuel cells is also measured, and the measurements are corrected to a constant temperature. In addition, it is also possible to take account of the aging state of the fuel cells in the evaluation.

Referring again to FIG. 3, the control device 40 controls the system 30 in such a way that the electrolyte moisture content and the excess of hydrogen are ascertained discontinuously, preferably only at periodic time intervals such as once per day, week or month.

Outside the periods of these measurements, the electrical load terminals 20, 21 of the module 1 are short-circuited, and hence an unwanted buildup of potential is avoided.

The measurements ascertained, for example maxima and minima of the current within one cycle, or values derived therefrom, for example absolute difference between these measurements or values ascertained for an amount of hydrogen or a concentration of hydrogen, are compared in the evaluation device 36 with at least one threshold value stored in a storage medium 47, and an error signal is generated and signaled externally by means of an optical or acoustic display 46 if a criterion in relation to the threshold value is satisfied, for example the threshold value is attained. Preferably, the evaluation device 36, after multiple threshold value comparisons that did not lead to any generation of an error message, generates a sign-of-life signal and likewise signals it externally by means of the optical or acoustic display 46. Storage personnel thus receive information that the monitoring is working and there is no fault or a fault.

The measurements ascertained and/or values derived therefrom and/or the fault and sign-of-life signals may also be stored by the evaluation device 36 together with timestamps in the storage medium 47 that can be read out by storage personnel and/or transmitted via the transmission devices 42, 43 to a central, especially cloud-based, monitoring system which is operated, for example, by the manufacturer of the fuel cells. It is thus possible to monitor a multitude of fuel cell modules 1 and, for example, to more easily identify mass production faults.

Corresponding functionalities may also exist in relation to the monitoring of the electrolyte moisture content.

Figure 11:
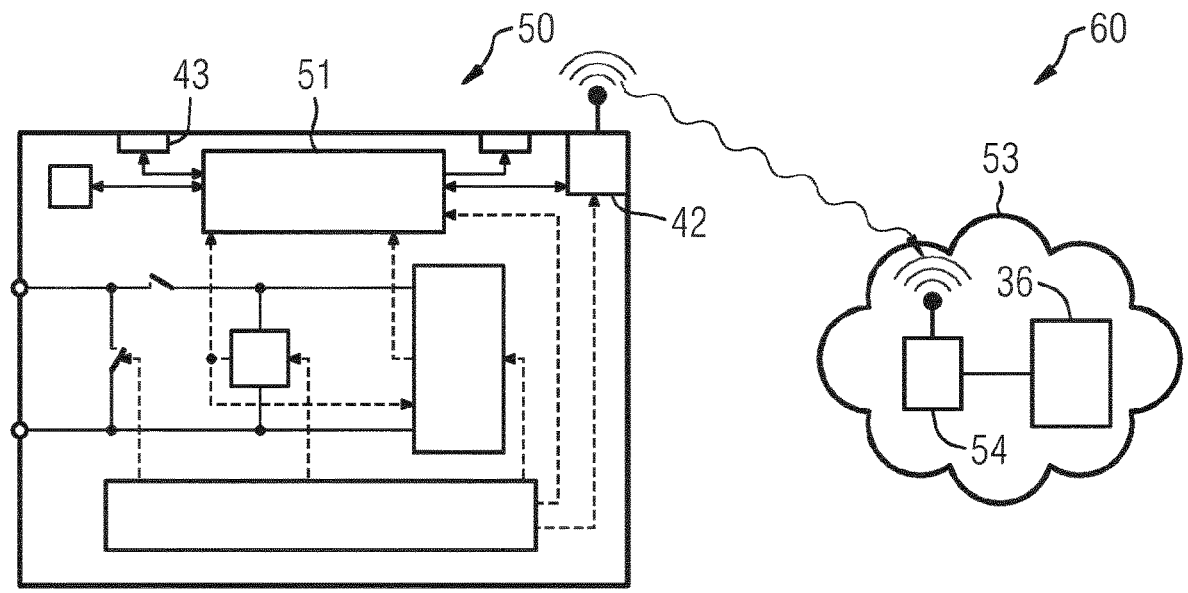

A system 60 shown in FIG. 11 differs from the system 30 shown in FIG. 3 in that it is divided into two component systems.

A first component system is designed as an analysis system 50 and is present locally at the site of the fuel cell module 1 and comprises the analysis devices 32, 35 and the transmission devices 42, 43.

A device 51 connected between the analysis devices 32, 35 and the transmission devices 42, 43 serves to combine the measurements or values derived therefrom from the analysis devices 32, 35 and to process them for transmission by means of the transmission devices 42, 43.

A second component system spatially separated from the fuel cell module 1 and the analysis system 50 is designed as an evaluation system 53 and comprises the evaluation device 36 and a receiving device 54 for the values received from the analysis system 50.

Figure 12:
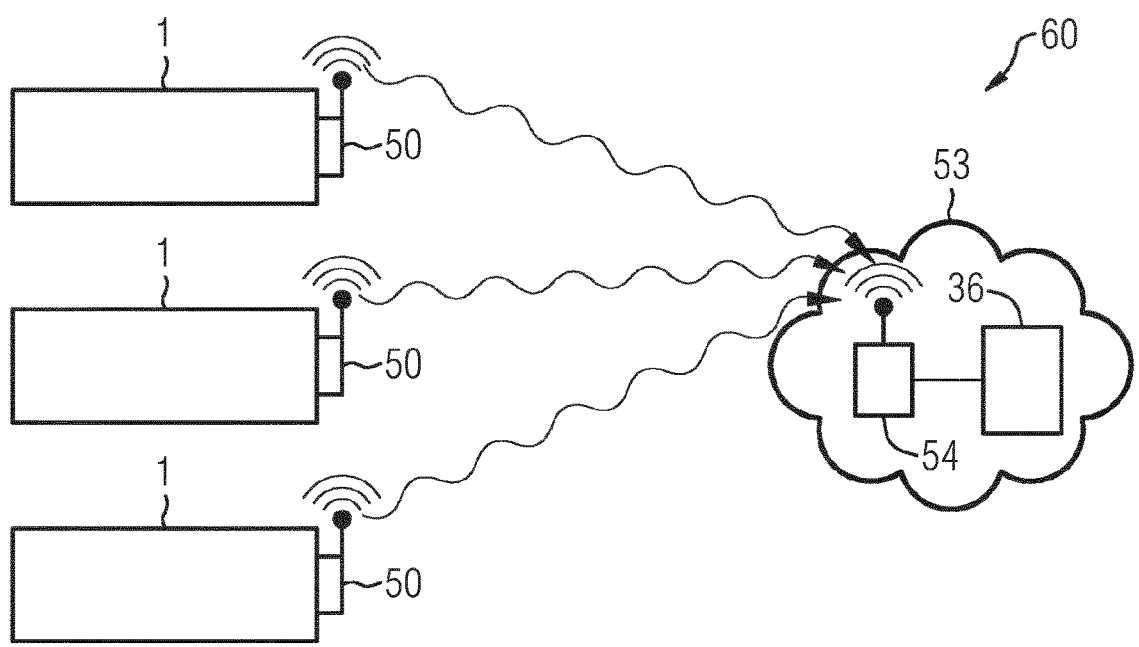

According to FIG. 12, the system 60 or the evaluation system 53 may also be utilized for monitoring of multiple fuel cell modules 1 each with an analysis system 50 mounted thereon.

By way of example, FIGS. 11 and 12 show a transfer of values from the analysis system 50 to the evaluation system 53 in a wireless manner by means of the transmission device 42 and the receiving device 54 (for example based on 3G, 4G or 5G mobile communication). The transfer may alternatively be wired by means of the transmission device 43 (for example based on Ethernet) or a combination thereof (for example a combination of WLAN and Ethernet).

If bidirectional communication is possible between the analysis system 50 and the evaluation system 53, the result of the evaluation, for example a fault signal, or even a sign-of-life signal, may be transmitted from the evaluation system 53 to the analysis system 50 and issued there, for example by means of the optical or acoustic display 46.

The invention thus enables monitoring of stored or nonoperational fuel cells 5 without interventions into the fuel cells. All that is needed is access to the load terminals 20, 21.

The invention may alternatively be utilized very advantageously for monitoring and/or control of a shutdown operation of the fuel cell module 1, especially in order to establish a desired gas atmosphere in the fuel cells 5, for example an excess of hydrogen.

Such a shutdown method is described, for example, in EP 0914 685 B1. In this method, in order to achieve an excess of hydrogen, in a first step, a supply of oxygen to the gas spaces 7 is stopped by closing an oxygen inlet valve. The remaining oxygen in the gas spaces is then consumed by electrochemical combination with hydrogen and generation of electrical power. When the oxygen has been largely used up, in a second step, supply of hydrogen to the gas spaces 6 is stopped by closing a hydrogen inlet valve.

In further steps, the gas spaces 6, 7 may be purged with nitrogen and then filled with hydrogen for storage.

All operations may be accompanied by cyclic voltammetry analyses in order to ascertain the respective current gas composition in the gas spaces 6, 7, and optionally even to utilize these findings for optimal control of the operations.

The invention claimed is:

1. A method of examining a fuel cell by means of a cyclic voltammetry analysis, the method comprising:
   ascertaining a gas composition in the fuel cell using the cyclic voltammetry analysis,
   wherein the fuel cell comprises a first gas space for a first reactant and a second gas space for a second reactant, where no reactant is supplied at least to one of the two gas spaces during the cyclic voltammetry analysis, and
   wherein the cyclic voltammetry analysis is used to ascertain a concentration of hydrogen in the gas spaces,
   the method further comprising:
   monitoring of a state of a stored or nonoperational fuel cell; and/or
   monitoring and/or controlling of a shutdown operation of the fuel cell.

2. The method as claimed in claim 1, further comprising:
   generating a piece of information and/or an optical signal when a criterion in relation to a threshold value is satisfied for at least one measurement in the cyclic voltammetry analysis and/or at least one value derived therefrom.

3. The method as claimed in claim 2,
   wherein the threshold value represents a minimum permissible concentration of hydrogen in the gas spaces.

4. The method as claimed in claim 1,
   wherein a scan rate for the cyclic voltammetry analysis of the fuel cell is less than 0.7 mV/s.

5. The method as claimed in claim 4,
   wherein the scan rate for the cyclic voltammetry analysis of the fuel cell is between 0.15 mV/s and 0.5 mV/s.

6. The method as claimed in claim 1, further comprising:
   ascertaining a moisture content of an electrolyte in the fuel cell, and
   adjusting a parameter from the cyclic voltammetry analysis comprising a scan rate, a minimum potential, and/or a maximum potential, depending on the moisture content ascertained.

7. The method as claimed in claim 6,
   wherein the moisture content of the electrolyte in the fuel cell is ascertained by means of impedance spectroscopy.

8. The method of examining a fuel cell as claimed in claim 1, further comprising:
   generating measurements from the cyclic voltammetry analysis on the fuel cell,
   transmitting the measurements and/or values derived therefrom to an evaluation device that is spatially separated from the fuel cell and/or is cloud-based, for ascertainment of the gas composition in the fuel cell depending on the values transmitted.

9. The method as claimed in claim 1,
   where no reactant is supplied to either gas space during the cyclic voltammetry analysis.

10. A system for examining a fuel cell, comprising:
    an analysis device for a cyclic voltammetry analysis on the fuel cell comprising a first gas space for a first reactant and a second gas space for a second reactant,
    an evaluation device designed to ascertain a gas composition in the fuel cell depending on the cyclic voltammetry analysis,
    wherein the evaluation device is designed to ascertain a concentration of hydrogen in the fuel cell,
    wherein the analysis device is configured to perform the cyclic voltammetry analysis when no reactant is supplied at least to one of the two gas spaces; and
    wherein the system is further configured to:
    monitor a state of a stored or nonoperational fuel call; and/or
    monitor and/or control a shutdown operation of the fuel cell.

11. The system as claimed in claim 10,
    wherein the evaluation device is designed to generate a piece of information, and/or an optical signal, when a criterion in relation to a threshold value is satisfied for at least one measurement in the cyclic voltammetry analysis and/or at least one value derived therefrom.

12. The system as claimed in claim 11,
wherein the threshold value represents a minimum permissible concentration of hydrogen in the gas spaces.

13. The system as claimed in claim 10, further comprising:
a device for ascertaining a moisture content of an electrolyte in the fuel cell
wherein the analysis device is designed to adjust a parameter from the cyclic voltammetry analysis comprising a scan rate, a minimum potential, and/or a maximum potential, depending on the moisture content ascertained.

14. The system as claimed in claim 13,
wherein the moisture content of the electrolyte in the fuel cell is ascertained by means of impedance spectroscopy.

15. A fuel cell apparatus, comprising:
at least one fuel cell; and
the system for examining the fuel cell as claimed in claim 10.

* * * * *